(12) United States Patent
Zinn, Jr. et al.

(10) Patent No.: US 6,187,537 B1
(45) Date of Patent: Feb. 13, 2001

(54) PROCESS AND APPARATUS FOR FORMING A DRY DNA TRANSFER FILM, A TRANSFER FILM PRODUCT FORMED THEREBY AND AN ANALYZING PROCESS USING THE SAME

(76) Inventors: Donald E. Zinn, Jr., 5C President Point, Annapolis, MD (US) 21403; Armand Francart, Jr., Rte. 896, R.D. No. 2, Box 119Z, Landenberg, PA (US) 19350

( * ) Notice: Under 35 U.S.C. 154(b), the term of this patent shall be extended for 0 days.

(21) Appl. No.: 09/066,563

(22) Filed: Apr. 27, 1998

(51) Int. Cl.$^7$ ..................................................... C12Q 1/68
(52) U.S. Cl. ............................................. 435/6; 435/283.1
(58) Field of Search .................... 435/6, 283.1; 536/25.3

(56) References Cited

U.S. PATENT DOCUMENTS 5,733,509 * 3/1998 Ackley et al. ........................ 422/131

* cited by examiner

*Primary Examiner*—Scott W. Houtteman
(74) *Attorney, Agent, or Firm*—Sughrue, Mion, Zinn, Macpeak & Seas, PLLC (57) ABSTRACT

Pivotable jigs or tables facilitate inversion or reciprocation of one or more well plates relative to a dry DNA transfer sheet to effect deposit of DNA gene solution as spaced spots on the surface of the transfer media sequentially to produce after drying of the DNA gene solution spots transfer of the dry DNA material from the spots by forcible impact or rubbing pressure through a printing mechanism of minute dry DNA dots onto a test substrate such as a glass plate for subsequent analysis optically via fluorescent labels to determine the presence or absence of mutations and a further identification of the mutation itself.

28 Claims, 6 Drawing Sheets

PROCESS AND APPARATUS FOR FORMING A DRY DNA TRANSFER FILM, A TRANSFER FILM PRODUCT FORMED THEREBY AND AN ANALYZING PROCESS USING THE SAME

FIELD OF THE INVENTION

This invention relates to the creation of a DNA analyzing array by separating DNA into individual genes, replicating the same and solubilizing DNA genes in a solution of tens, hundreds or thousands of distinct microscopic squares called "features" on a gene chip or substrate.

BACKGROUND OF THE INVENTION

Typically, the DNA is separated into individual genes and replicated many times in a number of 96 well plates (an industry standard) and minute pieces of DNA are positioned on an underlying substrate such as a chip from the DNA genes solubilized in a solution. After forming the DNA wet array and drying the DNA, the completed array is bathed in a solution of two or more fluoresces labeled total genomic tags, with the tags hybridizing to bind to a particular gene on the array by causing the fluoresces to fluoresce and by measuring the intensity of the signals, determinations may be made between the various features.

To date, the creation of such array is complicated, and while arrays have envisioned in terms of several thousand features per substrate area, such arrays are produced in terms of days rather than minutes. Further, while the well plates can store the individual genes within respective wells, over time the machine forming the wet arrays requires constant cleaning to deter contamination of the arrays. Once created, such gene chips are useful in testing for dozens of genetic diseases of different severity, and the test can be cheaply and quickly effected. Chips have been produced; however, significant energy is required to realize a practical chip.

Aeffymetrix, Inc. has recently disclosed an approach utilizing a glass slide as a substrate, about half the size of a postage stamp with thousands of distinct microscopic squares (features), each attesting for a specific DNA sequence. The features on the glass surface are covered with a compound containing chemical protecting groups that block further chemical reaction. Optically, collected protecting groups can be removed. A thin mask is then pulled over the chip containing holes to allow light to strike specific features, with the other features on the chip remaining protected. Subsequently, the chip is washed with a solution containing one of four DNA components called nucleotides (A, C, G or T). The DNA component washed solution binds only to the unprotected features. Each incoming nucleotide carries its own protecting group so that the washed features are reprotected. Sequentially, a new mask with different pattern of holes and optical (light) impingement removes the protecting groups at the different pattern of holes associated with a second group of features. In a multi-cycle process, chains of precisely ordered nucleotides are built onto each feature.

As may be appreciated, genes are made of two strands of DNA nucleotides of a specific order, bound to each other like the halves of a zipper. Nucleotide binding is governed by certain relationships. For instance, the nucleotide T always binds with that of A, but never with C or G, or with another T. Thus, a strand of nucleotides has a single complimentary strand which will match it and bind exactly. Thus, a chip (or other substrate) containing nucleotide strands of a given composition can find specific mutations in a person's genes.

Man has approximately 80,000 genes. Therefore, a DNA gene array of closely spaced features or dots of microscopic size may be constituted by as many as 400,000 dots on a single substrate and capable of carrying all DNA's for several persons, or one person in redundancy.

In the production of the liquid DNA gene arrays, DNA is extracted typically from tissue cells grown in cultures, the DNA is fragmented into thousands of pieces which can be chemically labeled with a fluorescent compound. The pieces contain parts of genes or whole genes. Thus, each feature of a chip contains a nucleotide strand of a normal or mutant section of a known gene. Thus, all possible mutations of a gene can be detected by features on a single chip and all may be tested simultaneously. By use of an optical scanner, the features on the chip can be read for fluorescent color and intensity. Features containing fluorescently labeled DNA may provide signals fed to a computer as input data, with that data being analyzed to provide information as to whether the person providing the genes carries one or more mutations, and further the identification of the mutation itself.

It is therefore a primary object of the present invention to provide a high throughput test system and components for ascertaining genetic mutations enhanced by the dry, orderly world of computer hardware in contrast to the wet and messy world of living tissue and of liquid DNA gene features applied to the slide by effecting a dry DNA transfer film to create in turn, a dry DNA analyzing array of features or spots on such slide.

SUMMARY OF THE INVENTION

The present invention, in one form, is directed in part to an improved high throughput process of forming a dry DNA transfer media, such as film, paper, nitrocellulose, plastic or glass. For example, a thin flexible, resilient film sized to the top surface of a generally rigid well plate having within such upper surface a plurality of closely spaced wells in column and line fashion within which are pre-placed separated, replicated DNA genes solubilized in a solution. The roughened surface of the thin flexible resilient film is sealed to the upper surface of the well plate. Means are provided for effecting a rigid film plate assembly. The assembly may then be inverted to cause the DNA solution under gravity to physically, locally wet coat the roughened surface of the film, with the roughened surface causing the DNA gene solution to cling to the film while preventing the DNA gene solution from running radially from one spot to another. The assembly is then reinverted to its initial position, and the DNA gene solution spotted film is removed slowly from the well plate. Upon drying, the DNA gene solution spot coatings thereon form a dry DNA transfer film capable of physical and chemical dry transfer of DNA to a substrate.

The spot diameter or dimensions of the same and the spot configuration depend on the size and configuration of the wells within the well plate. The DNA gene solution spots may be air dried to speed the process. A vacuum seal may be effected between the thin flexible resilient film and the underlying well plate to momentarily fix the film to the well plate prior to and while inverting the assembly. The thin flexible resilient film and well plate assembly may be secured in a fixture or jig to facilitate rendering the assembly components fixed during the inverting and reinverting steps and to maintain the seal between well plate and film during the initial liquid coating of the roughened surface of the film and to prevent the DNA gene solution from running between the wells.

In another aspect, the present invention involves a dry DNA transfer film as a product by the process described above.

In a further aspect of the invention, a dry form DNA analyzing process includes the following steps:
(a) sealing a flexible resilient film to the upper surface of a rigid well plate having a plurality of spaced wells opening to the upper surface and facing the film, the wells being prefilled with respective, separated, replicated DNA genes solubilized in a solution;
(b) forming a fixed, sealed assembly between the well plate and the overlying thin flexible film;
(c) inverting the assembly to transfer DNA gene solution spots to the facing surface of the film over localized areas of said film defined by respective wells;
(d) reinverting the assembly, removing the film and drying the transferred DNA gene solution spots to thereby form a dry DNA gene transfer film;
(e) placing the dry DNA gene transfer film in a position facing a flat glass test substrate and applying force and movement such as momentarily impacting the face of the DNA film on a face opposite that bearing the spots at the spot locations to cause dry DNA to forcibly locally contact the substrate; whereby
portions of the dry DNA spots are transferred from the transfer film to the test substrate by physical action and chemical attraction; and
(f) sequentially repeating the last step at different localized DNA spot locations on the dry DNA transfer film to complete a dry DNA gene test dot array on the test substrate. The velocity of the impact determines the mass of the DNA transferred for the force applied.

The process preferably includes the further steps of bathing the dots with one or more total genomic tag fluorescences to hybridize the tag to a particular gene of the array, and optically scanning the array to identify dots containing fluorescently labeled DNA to determine the existence of mutants or lack of same, and/or expression of known genes in the given cell line(s) or not. Alternatively, a rubbing force directed on the transfer media could transfer the dry DNA in a fashion involving a force applied tangentially to the test substrate with velocity and force over a time period resulting in a mass of DNA being transferred.

Preferably, minute pieces of dry DNA are transferred from the DNA transfer film spot to the substrate surface by feeding the film in a first direction while moving a multi-pin print head across the film at right angles to the direction of feed of the film while impacting a selected print head pin against the film at the back of a preselected DNA spot location to imprint a portion of a selected DNA spot onto the facing surface of the test substrate.

The DNA transfer film may be supported on a print tractor or like transport means for moving in a direction of the film's longitudinal axis via perforations along the laterally offset edges of the film, with the film underlying the print head and overlying a glass substrate and the print head moving transversely across the top of the DNA transfer film. The glass test substrate may be moved incrementally towards and away from the film, cyclically timed to the movement of one or more print head pins such that the substrate is immediately adjacent to the top surface of the DNA transfer film at the moment of print head pin impact with the opposite surface of the DNA transfer film to that carrying the dry DNA spots.

DESCRIPTION OF THE PREFERRED EMBODIMENT

Figures 1, 2, 3, 4:
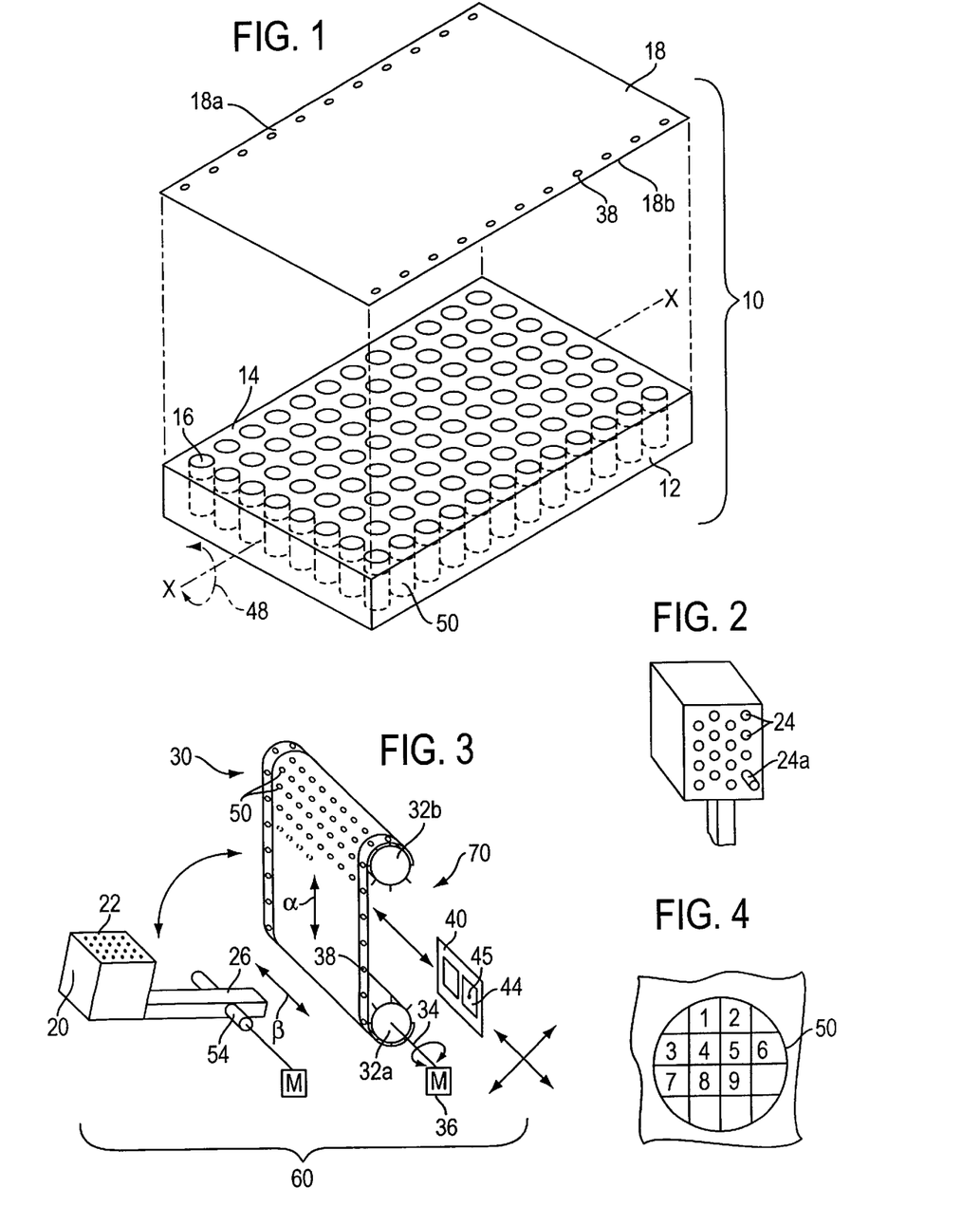
FIG. 1 is a schematic perspective view of a standard well plate covered by a DNA transfer film forming an invertible film/well assembly forming key components of the preferred embodiment of the invention.
FIG. 2 is an enlarged perspective view of a conventional print head employed in transferring dry DNA from DNA transfer films produced using the assembly of FIG. 1.
FIG. 3 is an exploded schematic representation of a printer setup showing the orientation of the print head, the DNA transfer film on the print tracker, and a multi-slide holder underlying the surface of the DNA transfer film carrying DNA spots for transfer of minute portions of dry DNA from the spots onto the surface of the glass slides as employed in the process of the present invention.
FIG. 4 is an enlarged view of a dry DNA transfer spot on the DNA transfer film showing the sequential shifted pin impact locations for a given print pin during multiple usage of the DNA transfer film.

Referring to FIG. 1, that figure illustrates a key aspect of the invention directed to the creation of a dry DNA transfer film for use in a DNA array test system forming one embodiment of the invention. A film/well assembly indicated generally at 10 is formed of an underlying 96 well plate 12 of rigid material of rectangular form and having a longitudinal pivot axis X—X. Within a top surface 14 of the well plate 12, there are created a series of upwardly open, cup-shaped, cylindrical wells 16 within the well plate top surface 14 of that member in spaced, column and line fashion. The well plate is an industry standard having 96 wells in an eight by twelve matrix. In the method or process using the assembly 10, initially DNA is separated into individual genes and replicated many times into a number of such well plates 12. Depending on the diameter and spacing of the wells 16, one to three 96 well plates 12 are sealed at the top 14 of the well plates commonly by an acid etched, frosted plastic film 18 or like transfer media which is both flexible and resilient, so that it attempts to maintain its flat condition as shown. At least one surface 18b of the plastic film 18 is etched. The DNA liquid 50 preferably fills the wells 16, with the DNA in liquid form representative of the individual genes within the many wells of the array. In the schematic embodiment shown, there is a single well and one plastic film. Typically, the film 18 is of a size 8½×11 with rows of spaced perforations 38 along opposite lateral side edges of the plastic film 18. The plastic film may be of a suitable material such as mylar, polyethylene, etc., and the acid etching provides a frosting to at least the surface 18b of the plastic film 18 so that the liquid DNA will physically attach to the plastic film. The other side 18a may be similarly etched to receive DNA dots. After the supply of liquid DNA of respective genes to wells 16, which liquid DNA charges may not come to the top of the wells, the plastic film 18 is sealed to the top or upper surface 14 of the rigid well plate 12. Sealing may be effected by a vacuum seal process well known in the art, or alternative means such as by using a jig or fixture which opens and locks closed and which both supports the assembly and permits the inversion of the assembly as indicated by the double headed arrow 48, FIG. 1, for rotation about the longitudinal horizontal axis of the well plate 12. A foam sheet (not shown) on a cover of the assembly facing the wells may press the mylar film 18 against the well plate. After sealing of the plastic film 18 to the well plate, inversion of the assembly 10 results in gravity deposit of the liquid DNA charges 50 in respective well locations onto the surface 18b of the plastic film. The frosting of that surface 18b prevents the liquid DNA from expanding radially from the initial spot and allows additional area for physical attachment of the DNA which has a configuration and size of the well bore. Initial inversion need last for only a second or so. This is all the time necessary to effect wet spotting of the surface 18b with the respective different DNA gene liquid charges 50.

Figure 5:
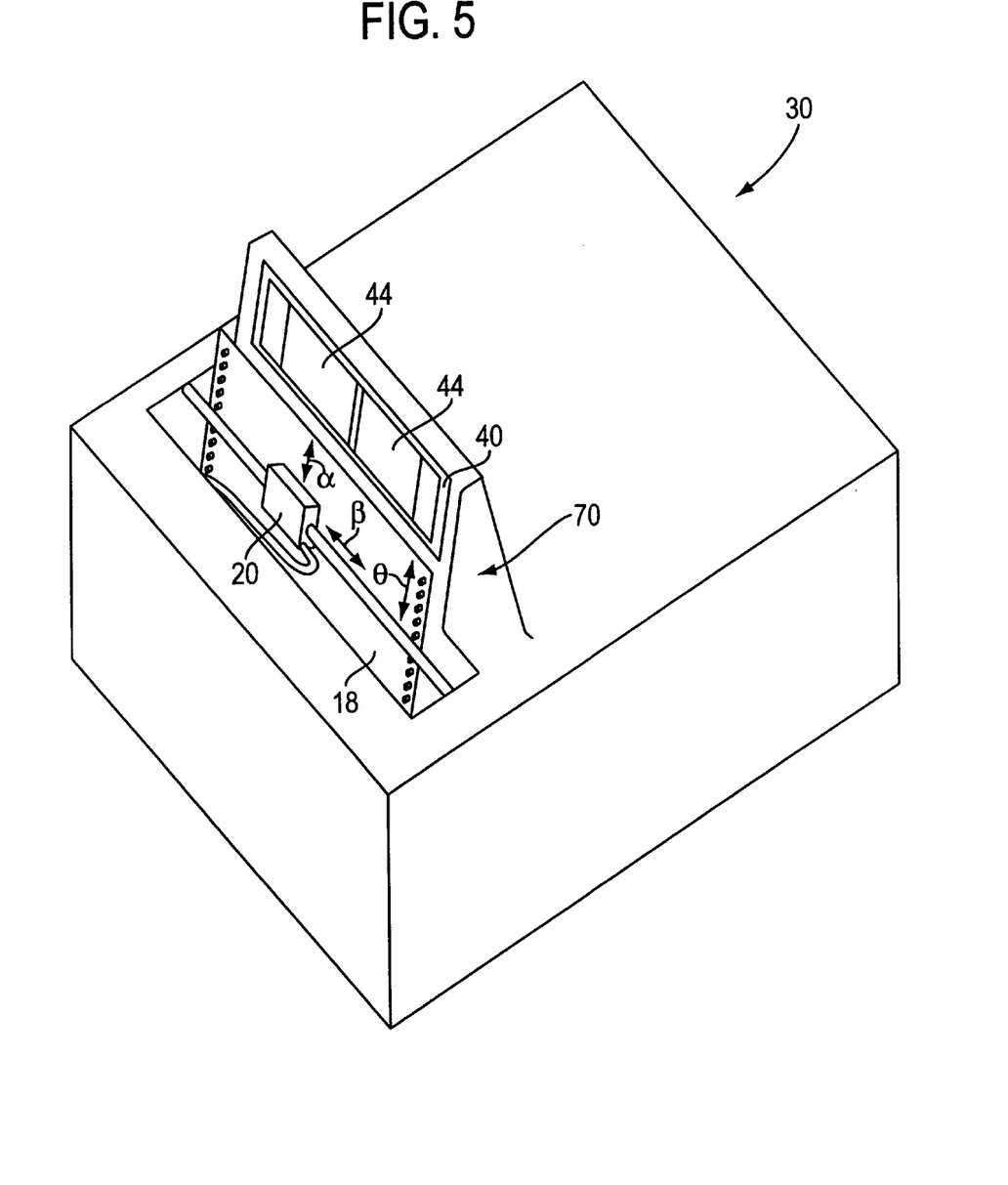
FIG. 5 is a perspective view of the printer incorporating a setup similar to that of FIG. 3.

Almost immediately, the assembly 10 is reinverted back to the position shown in FIG. 1. The plastic film may be exposed to the air, the liquid spots dried; thereby allowing the film to be slowly and carefully lifted from the well plate. With the DNA gene spots 50, FIG. 4, dried, there is formed a dry DNA transfer film. The DNA transfer film named for its likeness to carbon paper and its use in a printer for transferring small segments of the dry DNA spots 50 over the surface 18b of each film 18 is ready for loading onto a printer 60 such as DNA transfer film 30, FIG. 3. Printer 60 is comprised of a modified pin point print head 20 of block form having a face 22 within which is mounted a number of cylindrical, outwardly projectable and retractable print pins or type fonts. The print pins or font tips in the illustrated embodiment may be 250 microns in diameter and may be cylindrical in form. Tip size varies with array density. Depending on the configuration of the dry DNA dots to be positioned in column and line fashion, a number of slides as at 44, FIG. 3, may be borne by a slide holder 40. The pin head or font may be rectangular rather than circular in section. Since the printing process is quite similar to a computer controlled printing apparatus in general, the principal elements of such printing apparatus for printer 60 are shown only in schematic form, FIG. 3. In FIG. 3, the tractor 70 is shown as having sprocket wheels 32 mounted at opposite ends of a shaft, with the sprocket wheels engaging the perforations 38 within the opposite side edges of the DNA transfer film 18. In the exploded perspective view, the print head 20 is to the left of the tractor 70, with the head being of L-shaped configuration including a base 26 which pivots about an axis parallel to the axes of the sprocket wheel assemblies 32 on transverse shaft or rod 54. Additionally, the head 20 is mounted so as to move at right angles to the longitudinal axis $\alpha$ of the DNA transfer film 18 on a motor driven rod 52, thus laterally as per arrow $\beta$ from side-to-side of the DNA transfer film 18. Rod 54 may be rotated about its longitudinal axis to allow imprint of a selected pin 24 against the DNA transfer film 18. Such action may be incremental or continuous, as may be the drive $\theta$ for the tractor, FIG. 5. Such drives are indicated schematically, FIG. 3. A motor as at 36 is connected at 34 to a lower sprocket assembly 32a to achieve the movement of the DNA transfer film in the direction of its axis $\alpha$. Schematically, a further motor 32b connected to the bottom of the base 26 of the print head 20 via rod 54 may cause the print head to swing clockwise towards and counterclockwise away from the surface 18a of the DNA transfer film 18 to position face 22 of the print head in overlying position to the DNA transfer film. The microscope slide holder 40 is positioned beneath film 18 on the tractor 70 and the slides 44 maintained in a position to receive by transfer a small segment of a DNA spot 50, FIG. 4, carried on the opposite surface 18b of the DNA transfer film which immediately faces but is spaced slightly from the microscope slide holder 40. A computer or a CPU (Central Processing Unit) operating under a program controls movement of the print head 20, the DNA transfer film 18 and the slide holder 40 to determine the location of each closely spaced dot 45, FIG. 3, of DNA gene transfer film spot 50 directly onto the facing surface of a slide 44.

The slides 44 are precoated with poly-L-lysine, or other known chemical attractant of biomolecules including DNA. Thus, only light impact of the dry DNA spot 50 upon striking of one of the pins 24 of the array, FIG. 2, such as projected pin 24a, is required to ensure transfer of a sufficient amount of the DNA from the film spot 50 to a slide 44 upon impact of the printer 20 pin head 24. In the typical printer, the print head therefore travels horizontally, while the tractor riding on an infinite servo motor moves the DNA transfer film 18 vertically, i.e., at right angles as per $\beta$. The DNA gene array transferred from the DNA transfer film to the slide is only limited by the size of the slide itself. The slide size is only limited by the reader capacity of the system. Preferably, the slide holder and the slides 44 thereon are not in contact with the surface 18b, but under computer or CPU control raised to lie immediately beneath the surface 18b of the DNA transfer film 18, just prior to projection of the print head pin 24 in a limited, light contact with the surface 18a opposite a dry DNA dot 50 on slide facing surface 18b. Such system under computer or CPU control is capable of pin point transfer of minute surface area dots of DNA directly onto the facing side of the glass slides. Minute shifting of the print head 20 relative to the DNA transfer film 18 and its tractor 70 is effected after each cycle of printing, that is, for a given DNA spot 50, vertically and/or horizontally so that the DNA transfer film may be used over and over again. The sequence of alignment and thus print pin impact position on the opposite face 18a of the spot 50 in FIG. 4 illustrates shifts laterally; at one, two, diagonally; from two to three, laterally; three, four, five and six, diagonally; from six to seven, and laterally through eight and nine. Only nine of the incremental shifts of the print head relative to the DNA transfer film are shown in FIG. 4, since the numerals ten, eleven and twelve have been used elsewhere in the drawings. Further, the computer or central processing unit may effectively track all of the individual DNA transfer films for the number of times it has been used, and the use is through a controlled sequence of shifts such as that illustrated partially in FIG. 4. Preferably, the print head is moved to a new starting position slightly offset from the last for each time the film is reused in accordance with the schematic illustration at FIG. 4.

While not in use, the DNA transfer film may be stored under refrigeration at temperatures ranging from a +4° C. to −80° C. (depending on solvent and concentration). While the illustrated embodiment employs 3×1" glass slides, such microscopic slides may be larger such as 6×2 ", 4×8", etc. Theoretically, under the system illustrated and described, there may be in the neighborhood of 400,000 DNA gene dots on the glass slide, very closely spaced and generally in column and line fashion. Alternatively, the dots may be in staggered rows, not columns, as such allows greater dot array density. Since the DNA transfer film is flexible and resilient, there is only localized deformation of the mylar, polyethylene or other like material film, sufficient to bring the fraction of DNA spot 50 into contact with the glass slide 44 surface depositing the feature 45. Since that slide surface is coated with poly-L-lysine, there is both a physical and chemical transfer of the DNA from spot 50 on the DNA transfer film 18 onto the glass slide. The affinity of the poly-L-lysine for DNA ensures sufficient and consistent concentration of the DNA transferred to create a test dot or "feature" 45 as such dot is known in the industry. Once the array of DNA dots is created on the slide or slides of the holder 40, the slides are removed, and the completed array is bathed in a solution of two or more fluoresces labeled total genomic tags. These tags hybridize (bind) to a particular gene on the array and each time they bind the fluorescence signal becomes linearly stronger.

Under a fully automated system, a modified fluorescence microscope connected to the computer may automatically read each location on the array and measure the intensity of its signal and the identity of the signal being produced. By further computer correlations of data points, one may determine the relationships between any two cell types and a third variable (drug), or the same cell types between one variable or more.

The system of the present invention has significant utility in the medical field, the health industry in general and the pharmaceutical industry, both in terms of manufacture and use or detection and treatment of medical disease. The print process of the instant system takes a significant shorter period of time to create the dry DNA dot arrays on slides such as slides 44, thereby completing such arrays in minutes rather than days that occur with the systems currently creating arrays utilizing the wet technique where the DNA in wet form is deposited directly onto the microscope slides. Since the dry DNA transfer films can be stored indefinitely, the array is quickly reproducible without lengthy reactions.

In the past, arrays a.k.a. micro arrays, industry term of stored DNA dots or features required constant cleaning of the array apparatus to deter contamination of the array. In the system of the invention, the projected pins do not touch the DNA, but are isolated therefrom by the mylar transfer film, or like media. In systems where the DNA is transferred in liquid form onto the microscope glass slides, all elements coming into contact with the liquid DNA require periodic and constant cleaning. Further, by utilizing the frosted mylar or similar plastic film material, there is virtually no spread of the liquid DNA in the formation of the individual spots 50 on the frosted surface of the mylar film, or after removal of the DNA transfer film 18 from the well plate during the drying of the spots 50. The densi ty using the illustrated embodiment is quite high. With eight rows of twelve samples of DNA per row using a 24-pin print head 20, one obtains 288 DNA spots 50 on a single mylar sheet by using three of the 96 well plates. With the use of additional mylar sheets, easily a total of >7200 DNA dot combinations may be effected on two side-by-side glass slides 44 within a common slide holder like that at 40, using the setup of FIGS. 3 and 5. Further, in the creation of the DNA transfer film 18, automatic record keeping is facilitated since one may readily type data onto the reverse side of the mylar film, i.e. the date of the test, time, identification of the subject, type of test, etc. Not only does one have a thorough record of the test work done, but the actual proofs as a result of testing are attached as dry DNA content to the opposite side of the mylar film. All of this is done without the mess of dealing with liquid DNA, except in the first instant in a highly effective and quick manner producing the initial DNA spot form transfer sheets and then employing a conventional automated printing apparatus such as that at FIGS. 3, 5, to effectively transfer the dry DNA content to the glass slide in a form to permit ready optical testing for mutant content, etc. The flow diagram described in this specification is set forth in chart form as Chart A hereafter.

(1)  Input plate #
     Input contents of each well 1–96
     ↓
(2)  Input # of slides to be used
     Input size of slide to be used
     Input array density (or automatic)
     Input Film #
     Input # of film to be used
     Input Density of film array
     ↓                                    ↓
(3)  Output:location of the
     array on slide as map
     for user and reader
     computer if not the
     arrayer comp.
     ↓
(4)  Output:force applied by print head for each location, for
     consistency of DNA concentration transferred
     ↓
(5)  Arrayer/Reader output
  a) Array contents
     i.   fluorescence @ each print dot location
          (color/intensity)
     ii.  expression level of gene @ each location
     iii. correlation between dots (locations)
     iv.  correlation to previous data on same subjects or
          same drug, etc.

Figure 6:
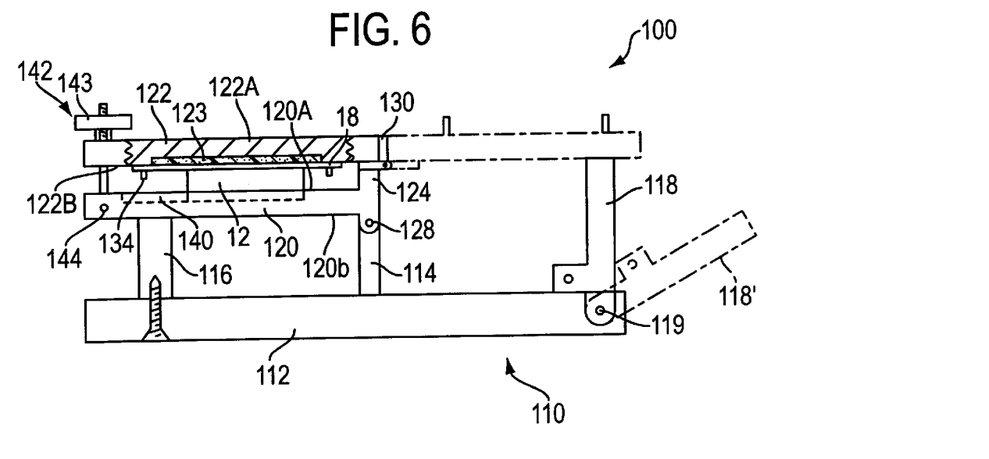
FIG. 6 is side elevational view of an apparatus for manufacturing a dry DNA transfer sheet in accordance with the principle set forth in drawing FIG. 1 and forming a further embodiment of the invention.
Figure 7:
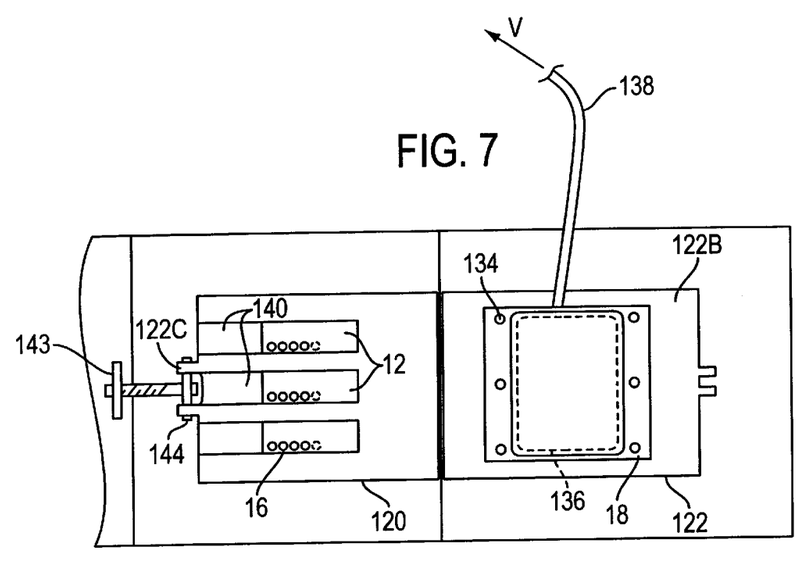
FIG. 7 is a top plan view of the apparatus of FIG. 6, with the cover pivoted 180° to open position.

Turning to FIGS. 6 and 7, there is shown an apparatus 100 for making dry DNA transfer sheets in accordance with the present invention, and in the manner generally depicted in FIG. 1. The apparatus 100 consists essentially of a table 110 having a horizontal base 112, from which extends upwardly and longitudinally centered between the ends of a pair of laterally spaced legs 114 pivotably mounting a table top 120 via a horizontal table top hinge pin 128 extending through table top vertical extension or raised end 124 and each leg 114. A fixed, vertically upright stop 116 underlies the table top 120 near the end of the table top 120 remote from the hinged pivot connection to legs 114. The fixed stop 116 is of a vertical height such that it abuts the bottom surface 120b of the table top to support the table top in a horizontal position. To the opposite side of the table 110 is pivotably mounted a pivotable stop 118 which is pivoted at its lower end via pivot pin 119. The pivotable stop 118 is centered laterally on the base 112. The pivotable stop 118 rises to a vertical height above that of fixed stop 116. A hinged cover 122 overlies the table top 120 and is hinged to the table top raised edge 124 by screws or like fasteners (not shown) and to a side edge of cover 122. The hinge 130 permits the cover 122 to be rotated from a position overlying the table top 120 through 180° to an oppositely directed horizontal position as shown in dotted lines in FIG. 6, and in solid lines in FIG. 7. As such, the apparatus cover rotates like a book into a full open position, FIG. 7. Because of the location of the hinge 130, the top surface 122A comes into contact with the top surface of the movable stop 118 when the movable stop is rotated from its inclined dotted line position shown in FIG. 6 at 118' to its full line position. A lower face 122B of cover 122 carries a rectangular recess which receives a foam sponge rectangular sheet 123 sized on the order of a dry DNA transfer sheet formed of mylar or other material as described in this specification. Projecting downwardly from the bottom surface 122B of the cover 122 are a number of dry DNA transfer sheet location pins 134, at least one at each of the four corners of mylar dry DNA transfer sheet 18 for overlying the three side-by-side well plates 12. Plates 12 as seen in FIG. 7 are received within spaced parallel grooves 140 opening outwardly at one end of table 120 and within the table top 120A and sized slightly larger than the width of the elongated well plates 12. The well plates are positioned within the grooves 140 so as to be appropriately positioned to align with the common mylar dry DNA transfer sheet 18. A pair of laterally spaced projections 122C are carried by cover 122 near the lateral center line of the table cover 122 defining a slot which receives a pivotable thumb screw assembly 142 including a shank pivotably mounted at its lower end to an outboard edge of the table top 120 via pivot pin 144. The assembly 142 includes a wing nut 143 which when unscrewed from the position shown in FIG. 6 allows the shank to pivot outwardly as shown in FIG. 7 to release the cover and permit its shifting from the full line position of FIG. 6 to the dotted line position in that figure and the full line position in FIG. 7. The two basic components, therefore, consisting of table 120 and cover 122 open like a book from the condition shown in FIG. 6 to that of FIG. 7. The apparatus 100 further comprises as seen in FIG. 7 a vacuum groove 136 within the bottom surface 122B of cover 122 connected to a source of vacuum indicated by an arrow V, FIG. 7, via vacuum line 138. With the apparatus open like a book, FIG. 7, mylar dry DNA transfer sheets 18 may be sequentially mounted via the perforations therein onto location pins along opposite sides of the vacuum groove and exterior of the same so that the bottom surface of the mylar sheet or film 118 is in contact with the bottom face 122B of cover 122. Application of vacuum pressure by vacuum source V causes the mylar sheet 18 to be maintained in exact desired position, whereupon with one, several or all of the wells of the well plates 12 being loaded with liquid DNA (or other, similar solutions), the cover 122 is pivoted counterclockwise from the dotted line position shown in FIG. 6 to the full line position. At this point, the pivotable thumb screw assembly 142 is rotated from the position shown in FIG. 7 to a vertical upright position, and the wing nut 143 rotated on threaded shank so as to clamp the cover 122 and thus the mylar sheet 18 against the upper surface of the upright open well plate 12, compressing the sponge sheet 123 to effect a seal between the inverted top surface of the mylar film 18 and well plate 12. A fixed assembly is achieved, i.e. table top 120 and cover 122, corresponding in principle to that of film/well plate assembly 10, illustrated schematically in FIG. 1. The assembly is rotated clockwise via hinge pins 128 after pivoting pivotable stop 118 from its full line vertical position to a dotted line inclined position 118', FIG. 6, the result of which is to cause the liquid DNA within given wells 16 of the three well plates 12 to make physical contact with the facing surface of the mylar sheet 18 and forming distinct, relatively large diameter, spaced dots. Thereafter, the rigid assembly of the cover 122 and the table top 120 is pivoted counterclockwise about the axis of hinge pins 128 back to the position shown in FIG. 6, whereupon the pivotable thumb screw assembly 140 is released by rotating the wing nut 143 oppositely on the threaded stem of that apparatus to loosen the lock which, after pivoting from a vertical to a horizontal position, permits the now released cover to be rotated clockwise again to the extent of the dotted line position of FIG. 6 and full line position of FIG. 7. The wet DNA spotted transfer sheet 18 may either be dried in place, or removed for drying with the apparatus ready to repeat the process to create a series of multiple mylar dry DNA transfer sheets.

Figure 8:
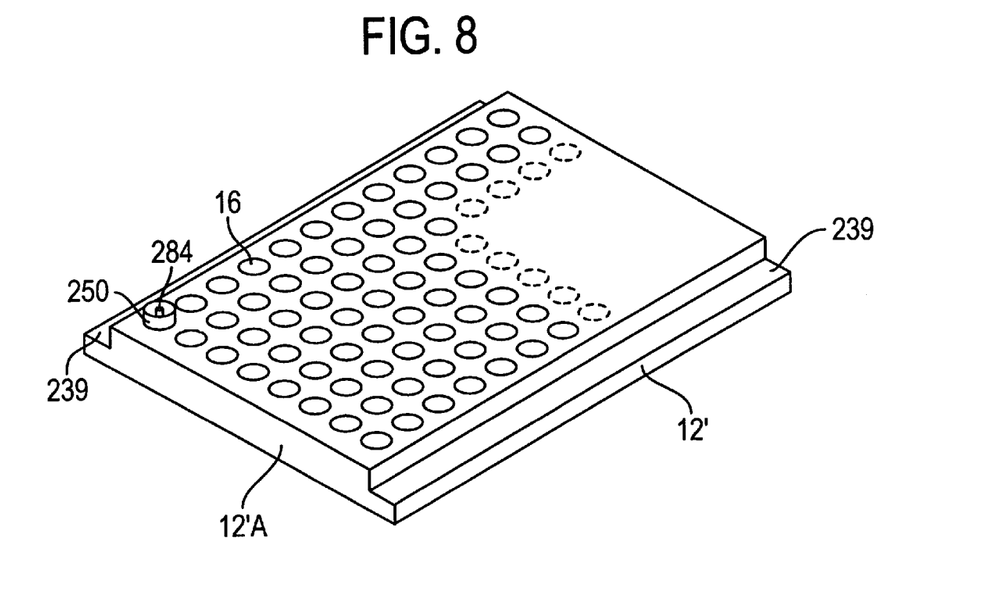
FIG. 8 is a perspective view of a standard 96 well plate with a dispensing valve positioned within one of the wells forming a further embodiment of the invention.
Figure 9:
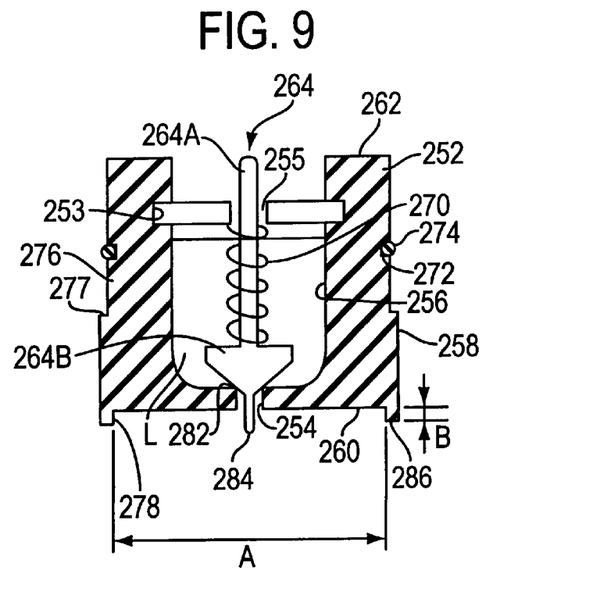
FIG. 9 is a vertical sectional view of the dispensing valve carried by the corner well in the embodiment of FIG. 8.
Figure 10:
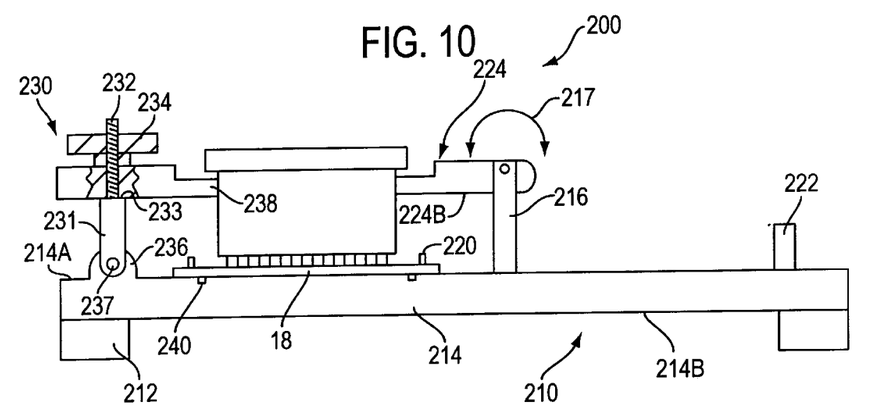
FIG. 10 is a side elevational view of an apparatus for manufacturing a dry DNA transfer film forming a further embodiment of the invention, with a plurality of side-by-side well plates carrying the dispensing valves of FIG. 9, with projecting tips thereof in contact with the upper surface of a mylar dry DNA transfer sheet.
Figure 11:
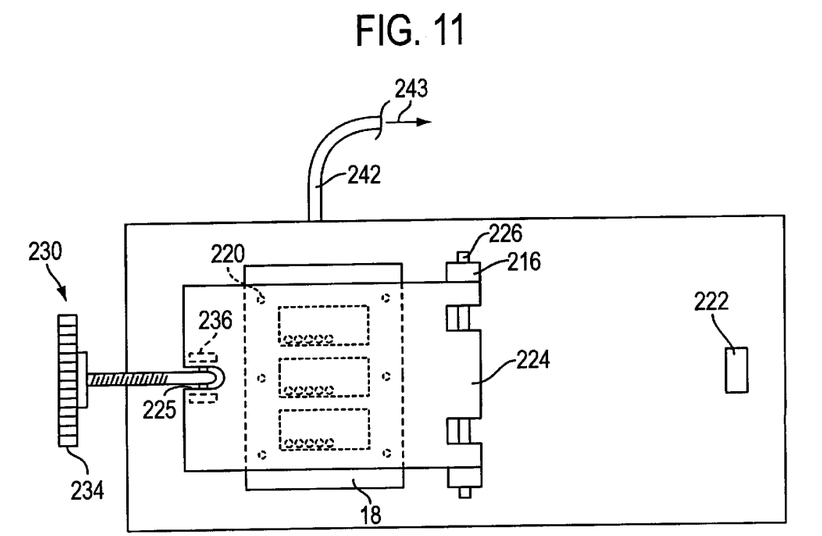
FIG. 11 is a top plan view of the apparatus of FIG. 10, with the hinged well plate holder unlocked.

Referring further to FIGS. 8, 9, 10 and 11, an additional embodiment of the invention utilizes an apparatus indicated generally at 200, FIGS. 10 and 11. Apparatus 200 has some common components to the apparatus at 100 of the prior described embodiment and functions to produce a series of DNA transfer sheets by using a different technique.

FIG. 8 illustrates perspectively one of three identical well plates with individual upwardly open wells 16, one of which at the left bottom corner has positioned within the interior of this U-shaped upwardly opening cavity a self-actuated dispensing valve indicated generally at 250 and forming the principal component of this further embodiment of the invention. The dispensing valve 250 in accordance with FIG. 9 is comprised of a cylindrical valve body 252 having an axial bore 254 of relatively small diameter and a large diameter counterbore 256 which opens outwardly at the opposite end of the cylindrical body 252. The valve body 252 has opposed faces 260 and 262 and an outer cylindrical wall 258. It houses internally a movable valve member or plunger indicated generally at 264 consisting essentially of a small diameter stem 264A enlarged intermediate of its ends by a conical shaped valve stopper 264B. The stopper 264B is radially larger than the diameter of bore 254. The body 250 includes a shallow axial recess 278 within end face 260. A radial circumferential recess 276 extends over a portion of the axial length of body 252 from face 262, within the outer peripheral wall 258 of that member. Additionally, a circular groove 272 of short depth and short axial height is formed within the larger diameter portion of body 252, within which may be fitted an O-ring 274, sealing body 252 with the inner peripheral wall of the well 16 within which it is received, FIG. 8. Near the open end of counterbore 256, an interior groove 253 receives a triangular plan shaped stem guide and the fill plate is provided with a small diameter axial bore 255 through which stem 264A projects. A compression coil spring 270 is interposed between guide plate 255 and the conical valve stopper 264B biasing the stopper 264B to valve closed position, with the tapered portion of the valve stopper in contact with a valve seat 282 defined by bore 254.

Once the valves 250 are in place in the respective wells 16 of well plate 12, FIG. 8, the well plate acts as a dispensing mechanism for the liquid DNA. As seen in FIG. 8, the projecting tip 284 of the movable valve member or plunger 264 extends outwardly beyond a ring stopper 286 defined by axial recess 260 which acts as a downward stop against an upper surface of a mylar dry DNA transfer sheet or similar media, when one or more well plates 12 utilizing the dispensing valves 250 are employed with the apparatus of FIGS. 10 and 11.

With the liquid charges within the wells 16 of well plate 12, the dispensing valves 250 are upturned from the position shown in FIG. 9 and inserted into the upwardly open wells to the extent of the axial length of the outer peripheral recess 276 within valve body 250 and defining a circular shoulder 277. Preferably, annular groove 272 on the outer periphery of the cylindrical valve body 252 carrying O-ring seal 274 prevents leakage of the liquid DNA from the individual cells between the valve body 252 and the sidewalls of the cells 16 carrying the dispensing valves 250.

The apparatus 200 depicted in FIGS. 10 and 11 permits predetermined volumes of DNA liquid to be dispensed through the dispensing valves onto the upper surface of a mylar dry DNA transfer sheet 18 as in the previous illustrated embodiment. The apparatus 200 includes a table indicated generally at 210. Table 210 includes a table top 214 supported by short height legs or feet 212 at the four corners in similar fashion to the embodiment of FIGS. 6 and 7. A vacuum line 242 connects to a vacuum groove 240 within the top surface 214A of the table top and may be coupled to a source of vacuum at 243 for holding down and in place on the table top a mylar dry DNA transfer sheet located by way of location pins 220 prior to vacuum application. Laterally spaced risers 216 provide a hinge connection to one end of a pivotable well plate holder 224, via an elongated hinge pin 226 passing through respective risers 216 adjacent their upper ends and the end of well plate holder 224. As such, well plate holder 224 is mounted for rotation through an arc of approximately 180° from the position shown in FIGS. 10 and 11 so that the upper surface 224A comes into contact with the upper end of a fixed stop 222 mounted to the upper face 214A of the table top, at some distance to the right of risers 216. This permits freedom to properly position the mylar dry transfer sheet 18 in the position in FIGS. 11, 12 for receiving spaced drops or volumes of liquid DNA of the DNA solution to form the appropriate spot on the surface of the film 18. After mounting of the film 18 to the table top, the hinge well plate holder is rotated counterclockwise to the position shown in the drawing FIGS. 10, 11. The end of the hinge well plate holder 224 opposite that of the hinge connection via hinge pin 226 is provided with a U-shaped slot 225 for receiving a reduced diameter threaded portion 232 of a pivoted locking pin 231 forming an element of thumb screw assembly 230. The locking pin 231 is pivotably mounted via a transverse pivot pin 237 to the table top 214 via a pair of laterally spaced ears 236. A thumb screw locking knob 234 having a tapped axial bore is threaded to the reduced diameter threaded portion of locking pin 231. The bottom surface 224B of the well plate holder 224 rests on a shoulder or stop 233 at a point along the locking pin 231 to maintain the hinged well plate holder spaced some distance above the upper surface 214A of the table top 214 and in a horizontal position. Three laterally spaced rectangular holes or openings 238 are formed within the hinged well plate holder 224, the openings 238 being sized to reduced width base portions 12'A of the well plates 12' as seen in FIG. 8. Grooves 239 are formed within the top longitudinal side edges of the well plate 12', thereby defining laterally opposite flanges 239 along the sides of the well plate. Thus, a portion of the well plate 12' adjacent to the upper surface of that element is narrower than the portion proximate to the bottom of the well plate. The flanges 239 function as stops to limit the extent of vertical movement of the well plates 12' when the reduced width portions are inserted within respective holes or openings 238 within the well plate holder 224. Initially, the well plates 12' are gently lowered into the openings or holes 238 to the extent where the tips 284 of plungers 264 contact the upper surface of the mylar sheet 18 as per FIG. 10. In this embodiment, there is no need to flip flop the well plates 12' to deposit liquid DNA on the mylar film by gravity deposition. When the tips 284 of the stoppers 264 touch the mylar film, all that is required is a slight downward pressure applied to the well plates, which may be manually or automatically effected to cause the radially enlarged tapered well stoppers to move away from their valve seats 282, thereby permitting the DNA solution L to escape from counterbore 256 of each valve body 252 for each valve 250. Simultaneously, circular ring stop 286 of the valve body abuts the upper surface of the mylar film 18, with the liquid DNA in this embodiment filling a cavity defined by the vertical height B of recess 260 and the interior diameter A of the ring stop 286. Exact, minute precise dimensions are required for the valve member to effect a small liquid charge deposit by each of the dispensing valves 250 capable of spot wetting of the transfer media. Alternatively, the volumetric control of the liquid DNA charge at each spot location on the mylar transfer film 18 may be determined by the extent of time that the dispensing valve 250 is open and determined by the dimensions of the flow paths defined by the stopper 264 and the axial bore 254 within the valve body 252.

Once the spot wetting of the mylar sheet is accomplished, the pressure applied to the well plates is terminated and the valves reclose. The valves 250 automatically close due to the force of the compression coil spring interposed on the stem 264A with the plunger 264 closing on valve seat 282 for each valve. Thus, even when the well plate 12' is inverted from the position shown in FIG. 8, no leakage will occur. Thus, dispensing of a liquid volume is carefully controlled with resealing of the liquid DNA within counterbore 256 of the valve member at the termination of the spot wetting of the mylar 18.

Further, upon release of pressure on the three well plates 12A, the thumb screw 234 may be backed off and loosened to the extent permitting pin 31 to be rotated from a vertical upright position, FIG. 10, to a horizontal position, freeing the hinged well plate holder 224. This permits its rotation clockwise to the extent of permitted by fixed stop 222 and allowing access to the exposed mylar sheet 18 for drying prior to removal or for removing and subsequent drying of the liquid DNA spots after their creation. With the hinged well plate holder pivoted clockwise out of the way of the mylar sheet area, a new mylar sheet 18 may be positioned via the pins 220 and vacuum pressure reapplied to the succeeding sheet.

Figure 12:
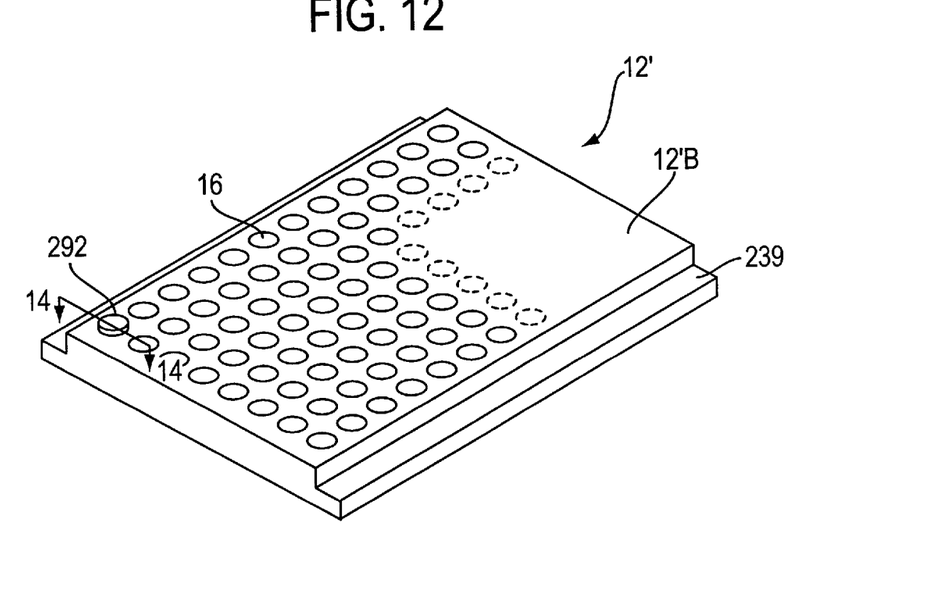
FIG. 12 is a perspective view of a standard 96 well plate with a cylindrical porous material liquid dispensing wick fitted to the top of a corner well within the well plate for use with the apparatus of FIGS. 10 and 11 and forming a further embodiment of the invention.
Figure 13:
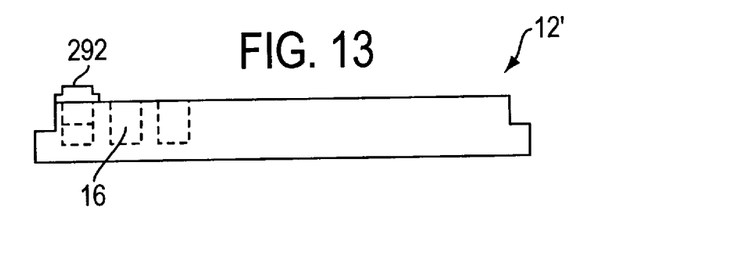
FIG. 13 is a side elevational view of the well plate of FIG. 12.
Figure 14:
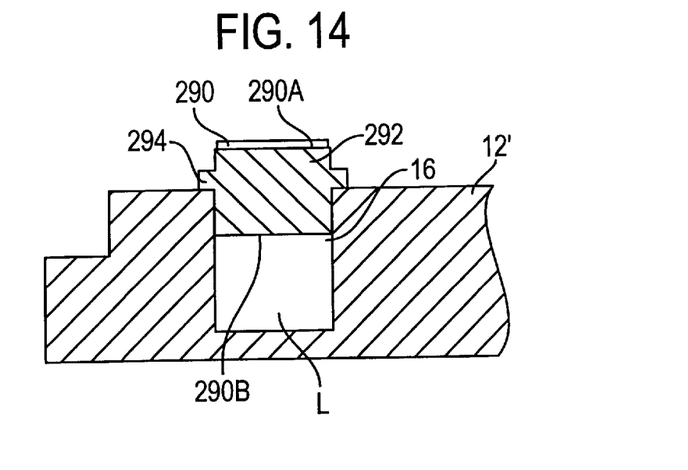
FIG. 14 is an enlarged sectional view through lines 14—14 of FIG. 12.

FIGS. 12, 13 and 14 illustrate a further embodiment of the invention, in which a well plate 12' identical to that at 12', FIG. 8, is employed in the apparatus of FIGS. 11 and 12 as depicted or with slight modifications thereto. In this embodiment, the top face 12'B comes into close proximity to an underlying mylar dry DNA transfer sheet 18 to allow a thin layer of liquid DNA film on a special dripless applicator wick 290, FIG. 14, to make contact with the upper surface of the mylar film 18 and to create a circular spot corresponding to the diameter of the applicator wick. The inverted T-shaped well plate 12' of FIG. 12 is provided with a plurality of cup-shaped wells 16 in a column and line fashion. A singular well is shown in FIG. 12 as receiving an applicator wick 290, the cross-section of which is shown in FIG. 14. The applicator wick 290 is of cylindrical form, having an outside diameter slightly larger than the inside diameter of a well 16 and having a length so as to project into the liquid DNA charge L. A radially projecting circular rib 294 is integral with the cylindrical body 292 forming a stop to define a precise axially projected position for the wick upper surface 290A so as to create through capillary wicking action passage of the liquid DNA or DNA solution onto the outer axial surface 290A of the applicator wick. This achieves permitting a DNA solution blotting action upon inversion of the well plate 12' and placement into position above the mylar sheet 18, FIG. 10, in place of the well plate 12' carrying the dispensing valves 250 of the prior described embodiment of FIGS. 8–11. The dimensions of the well plate and the dimensions of the applicator wick for each well 16 are such that a slight depression of the inverted one or more well plates 12' causes momentary contact of at least the liquid DNA film 290 on the axial outer surface 290A of the applicator wick with the facing surface of the mylar film 18 at each well position 16 on the well plate carrying an applicator wick 290 and being loaded with liquid DNA in accordance with the showing in FIG. 14. The volume of the well is defined by the bottom surface of the disc 290B.

The sequence of events using the embodiment of the invention of FIGS. 12–14 is the same as that for the prior embodiment, utilizing the dispensing valve 250 within each selected well 16, by employing the apparatus of FIG. 10. The well plate holder is initially pivoted clockwise from the position shown in FIG. 10 so that its end remote from the pivot axis of pin 226 lies in contact with the upper surface of stop 222. A mylar sheet such as that at 18 is positioned on the upper surface 214A of the table top and positioned by way of position pins 220 in the manner of the prior embodiment. The well plate holder 224 is then rotated counter-clockwise (217 depiction of angular rotation) 180° to overlie the mylar sheet 18. The well plate holder may be locked in position using mechanism 230 as in the prior embodiment, and preferably three identical well plates with DNA liquid within the wells 16 and closed off by the applicator wicks 292, penetrating the well to a fixed point controlled by flange 294, are inverted from the condition shown in FIGS. 12, 13 and 14 and placed in respective holes or openings 238, with the flanges 239 limiting that insertion action, but placing the axially outer surfaces 290A of the applicator wick immediately above or in contact with the facing surface of the mylar film 18, whereupon the liquid DNA due to the porosity of the foam material or other wick material making up the applicator wick 292 causes a thin layer of liquid DNA to form as a film as at 290 which is blotted off as a result of momentary contact between the applicator wick 290A and the facing surface of the mylar film 18 with like spaced liquid DNA spots being formed over the face of the mylar film in mirror image fashion to the wells 16 which are actively supplied with liquid DNA prior to insertion of the applicator wicks 292. The applicator wicks therefore perform two functions, one sealing the liquid DNA within the well 16 in the volume not occupied by the wick body 292 and facilitating by capillary action a constant replenishment of the liquid DNA film 290 on the axially outer surface 290A of the applicator wick. Upon completion of wet spotting, the locking mechanism is loosened and rotated out of the way of the pivotable well plate holder 224. Thereafter, the holder with the well plates 12' can be rotated through a 180° arc clockwise until the top of the well plate holder contacts the upper end of fixed stop 222 upon which it rests, allowing the operator to remove the now wet DNA spotted mylar film 18 and replace it with a new succeeding sheet. The removed sheet upon drying forms a dry DNA transfer sheet which may be used in the printing apparatus as described with the prior embodiment, or stored under appropriate temperature prior to such printing use.

It should be apparent that changes and modification may be made without departing from the spirit of the invention as claimed. For instance, the printing apparatus as shown in FIGS. 2–5 is evidences only one type of commercially available printing apparatus capable of utilizing the dry DNA transfer media in sheet form, endless loop form, tape form, rigid substrate form or otherwise, and which a printing apparatus may achieve imprinting of DNA particles sized to the print font or print pin dimensions by impacting the back face of the print media carrying the dry DNA spots to create a DNA dot of micron size onto the facing surface of an underlying substrate. Impact printing involves force plus movement. Alternatively, pressure plus movement such as by rubbing may be employed to transfer dry DNA spot material from a transfer media onto the facing surface of a rigid glass substrate such as a glass slide or the like.

It should also be apparent that while the invention has been described in detail with several embodiments utilizing a mylar sheet or film whose surfaces are roughened to receive the liquid DNA charge using the apparatus within the drawing figures, such print media may be constituted by a flexible tape carried by and movable between a feed and take-up spool. A transfer media may take the form of a porous sheet of paper which incorporates means for preventing radial dispersion of liquid DNA in forming the dry transfer media radially from one liquid DNA spot to another. Such porous paper type print media may be constituted by a laminate structure having circular areas sized and located corresponding to the respective wells providing the liquid DNA to achieve multiple spots in staggered or columnar and line fashion using the apparatus of the present invention. Alternatively, a porous paper sheet may be embossed with circular rings sized to the diameter of the wells of the well plate and in like numbers, with the embossments preventing the radial dispersion of the liquid DNA through the porous paper beyond the dimension of the indentation corresponding to the well diameter of the wells within the well plate. Such porous print media is seen as similar, but not identical to carbon paper, with the carbon surface content being physically equivalent to the dry DNA spots on the dry DNA transfer sheet. The porous paper form of dry DNA transfer media can be formed of a porous material which impedes radial dispersion of the liquid DNA spots during and subsequent to spot formation and prior to drying of the same. Drying may be accomplished by exposure to air, hot air drying, or infrared radiation to speed up the process of the creation of the dry DNA transfer media.

It should be kept in mind that while the specification and claims recite a DNA wet solution and dry DNA spots and dots, respectively, the claims and the invention are not limited thereto, but broadly cover the utilization of and transfer of a concentrated solution of DNA, RNA, protein or other biomolecules from one or more well plates or other container to an appropriate transfer media utilizing as an imprinting substrate any type of porous paper, film, flexible resilient sheet, or rigid substrate that inherently or by way of treatment or modification will bleed liquid, i.e. the concentrated solution in a Z direction, while inhibiting or limiting bleed laterally or radially, with that substrate preferably being an acid etched polymer film such as mylar. Further, while the printing mechanism, which is schematically illustrated in the drawings and described in some detail in the specification, uses a motor driven tractor to drive a transfer media in sheet or endless loop form via sprockets having radially projecting pins whose ends insert into holes along the sides of the transfer sheet or endless loop, movement of the dry DNA transfer media may be effected by a position control through the use of laser beam or light locating means to facilitate by lateral movement of a print head bearing multiple projectable pins or type font such that a given quantity of the DNA, RNA, protein or other biomolecule dry spot on the transfer media is mechanically transferred by impact force or rubbing pressure onto a facing glass substrate which in turn may be shifted towards and away from the dry DNA transfer media.

Further, while vacuum grooves and vacuum application is illustrated as a means for maintaining the position of the ink printing substrate, other means such as mechanical clamping may be employed to ensure sealing of that member to the face of the well plate or an array of well plates prior to the transfer step. While preferred exemplary embodiments of the invention have been described in detail, it should be understood that other variants and embodiments thereof are possible within the spirit and scope of the claims, with the latter being defined by the appended claims. Further, all features described in the specification, recited in the ensuing claims and shown in the drawings, may be essential to the invention, either individually or in any arbitrary combination with one another.

It should be understood that various changes can be made without departing from the spirit and scope of the invention. The preferred embodiment of the invention is illustrative only and modifications and variations in content of the embodiment and in the process steps in the production of the components of the dry DNA array system would occur to those of skill in this art without deviating from the invention. Within the scope of the appended claims, the invention may be practiced other than as specifically described or shown above.

What is claimed:

1. Process of forming a dry DNA transfer media comprising:
    placing liquid DNA solutions within respective upwardly open spaced cup-shaped wells within a well plate;
    causing localized momentary contact between an ink printing substrate and the DNA solutions within respective wells to create wet DNA solution spots at corresponding locations on said ink printing substrate; and
    drying said spots to form said dry DNA transfer media for use in forcible impact or rubbing printing of dry DNA dots onto a facing glass test substrate from said selected dry DNA spots on said media.

2. The process as claimed in claim 1, wherein said process further includes sealing said ink printing substrate face-to-face against said well plate in a position covering the openings of said well to create a sealed assembly and inverting said sealed assembly to wet coat the face of said media to create DNA solution spots at positions corresponding to the positions of said wells.

3. The process as claimed in claim 1, wherein said ink printing substrate comprises one material of the group consisting of plastic, glass, nitrocellulose, acetate and paper.

4. The process as claimed in claim 3, wherein said ink printing substrate comprises a mylar sheet, and wherein said mylar sheet has a roughened surface facing said well openings.

5. The process as claimed in claim 1, further comprising porous wicks fitted within each cell having one end contactable with the DNA solution within the wells and having another end of the wick at least flush with the surface of the well plate bearing the wells such that a layer of DNA solution forms on the end of the wick exposed at the surface of the well plate, and said process further comprises placing said ink printing substrate in contact with the coated ends of said wicks to form wet DNA liquid spots on said ink printing substrate.

6. The process as claimed in claim 5, further comprising the step of inverting an assembly of said well plate and said ink printing substrate to ensure DNA solution spotting of the ink printing substrate at said well locations.

7. A process forming a plurality of spaced dry DNA dots on a glass substrate for testing purposes, said process comprising:
    placing liquid DNA solution within an array of spaced cup-shaped wells within a well plate;
    causing localized, momentary contact between an ink printing substrate and the liquid DNA within respective wells to create a corresponding series of spaced wet DNA spots on said ink printing substrate;
    drying said spots to form a dry DNA transfer media and placing said dry DNA transfer media in proximity to said glass substrate, with said dry DNA spots facing a surface of said glass substrate; and
    selectively, locally pressure impacting the opposite face of said dry DNA transfer media behind said dry DNA spots to cause mechanical transfer of dry DNA dots from said media spots to the facing surface of said glass plate.

8. A high throughput process for forming a dry DNA transfer film comprising:
    placing separated, replicated DNA genes solubilized in a solution within respective wells of a generally rigid well plate having within an upper surface thereof, a plurality of closely spaced wells;
    fixedly mounting a thin flexible resilient film against said upper surface and sealed to the upper surface of the well plate and effecting a rigid film plate assembly;
    inverting said rigid assembly to cause the DNA solution to physically, locally wet coat a surface of the film while preventing the DNA gene solution from running radially from one spot to another;
    reinverting said assembly to its initial position;
    removing the DNA gene solution spotted film slowly from the well plate;
    drying the DNA gene solution spot coating thereon and thereby forming a dry DNA transfer film capable of physical and chemical dry transfer of DNA to a test substrate.

9. The process as claimed in claim 8, wherein said step of drying the DNA gene solution spot coating comprises air drying.

10. The process as claimed in claim 8, wherein said step sealing said thin flexible resilient film to said well plate top surface comprises forming a vacuum seal between said well plate and said thin flexible resilient film.

11. A dry DNA transfer film formed by the process comprising:
    placing separated, replicated DNA genes solubilized in a solution within a plurality of spaced cup-shaped wells within a generally rigid well plate, with said cells opening to a top surface of said well plate;
    fixing a flexible resilient film having a roughened surface to said top surface of the well plate, with said roughened surface facing said well plate top surface;
    effecting a rigid film plate assembly;
    inverting said assembly to cause the DNA solution to physically, locally wet coat the roughened surface of the film, with the roughened surface causing the DNA gene solution to cling to the film as spaced dots corresponding to the well position while preventing the DNA gene solution from running radially from one spot to another;

reinverting the assembly to its initial position;

removing the DNA gene solution spotted film from the well plate; and drying the DNA gene solution spots to form a dry DNA transfer film capable of physical and chemical dry transfer of the DNA to a test substrate.

12. A dry form DNA analyzing process comprising the following steps:

prefilling respective separated, replicated DNA genes solubilized in a solution within a plurality of upwardly open spaced wells within an upper surface of said rigid well plate;

sealing a flexible resilient film at a predetermined position on the upper surface of said rigid well plate, with said film covering the prefilled wells;

forming a fixed, sealed assembly between the well plate and the overlying thin flexible film;

inverting the assembly to transfer DNA gene solution as spaced spots to the facing surface of the film over localized areas of said film defined by respective wells;

reinverting the assembly;

removing the film and drying the transferred DNA gene solution spots to thereby form a dry DNA gene transfer film;

placing the dry DNA gene transfer film in a position facing a flat glass test substrate and momentary pressing the face of the dry DNA gene transfer film opposite that bearing said spots at spot locations, causing pieces of dry DNA to locally contact the test substrate such that portions of the dry DNA spots mechanically transfer from the transfer film to the test substrate by physical action and chemical attraction;

sequentially repeating the last step at different localized dried DNA spot locations on the dry DNA gene transfer film to complete a dry DNA gene test dot array on the test substrate; and bathing the dots with two or more total genomic tag fluoresces to hybridize the tag to a particular gene of the array and optically scanning the array to identify dots containing fluorescently labeled DNA to determine the existence of mutants or lack of the same.

13. The process as claimed in 12, wherein the step of causing dry DNA to locally contact the test substrate comprises feeding the film in a first direction while moving a multi-pin print head across the film at right angles to the direction of feed of the film and impacting a selected print head pin against the film at the back of a preselected DNA spot location to forcibly imprint a portion of the DNA spot onto the facing surface of the glass test substrate.

14. The process as claimed in claim 13, wherein said dry DNA gene transfer film is supported on a print tractor for movement in a direction of the film longitudinal axis via perforations extending along laterally offset edges of the film engaging motor driven sprocket wheels, wherein the film underlies the print head and overlies said glass test substrate, and wherein the print head moves transversely across the top of the DNA transfer film.

15. The process as claimed in claim 14, further comprising moving said glass test substrate incrementally towards and away from the plane of said film, cyclically timed to the projection of print head pins from within said print head, such that said glass test substrate is placed immediately adjacent to the surface of the dry DNA transfer film at the moment of print head pin impact, with the surface of the DNA transfer film opposite to that of selected projected print head pins.

16. Apparatus for forming a dry DNA transfer media comprising:

a table, said table including an elongated table base extending horizontally, a vertical riser extending upwardly from the base intermediate of ends of the base, a horizontal flat table top hinged at one end to said vertical riser, a fixed stop mounted upright to said base and underlying said table top remote from said first hinge, a cover overlying said table and hinged by a second hinge to said table top so as to extend parallel to said table top overlying the same in first position and being rotatable 1800 to an open position extending parallel to the table top and to the side of said center leg opposite that of said table top, a pivotable stop mounted to said base to the side of said center post opposite that of said fixed stop and underlying said cover when said cover is pivoted from said first position to said second position and being of a vertical height so as to maintain said cover horizontal when in said second position, the bottom surface of said cover being flat and including location pins for locating and fixing the position of said media on said bottom surface of said cover, means for positioning at least one well plate in fixed lateral and longitudinal positions on the upper surface of said table top at a position aligned with that of said transfer media, clamping means for fixing said cover in spaced overlying position on said table top, with said transfer media overlying said well plate, said well plate including a plurality of spaced upwardly open wells adapted to carry separated, replicated DNA genes solubilized in a solution within respective wells, said apparatus further comprising means for sealing the transfer media against the upper surface of said well plate and covering said upwardly open wells, whereby with said cover in said second position said transfer media may be fixed in a designated position on the bottom surface of said cover via location means, and said at least one well plate may be fixedly positioned at a predetermined position on the upper surface of said hinged table top, wherein by rotation of said cover 180° from said second position to said first position and by operation of said clamping means for fixing said cover in spaced overlying positions with respect to said table top, a fixed assembly may be achieved, whereupon subsequent rotation of said fixed assembly including said table top through a 180° from its position against the fixed stop in a direction towards said movable stop and by moving said movable stop to an inclined position on said table base, said assembly is inverted to cause the DNA solution to physically, locally wet coat the surface of said media creating spaced spots of DNA solution, whereupon the assembly may be pivoted about said first end through 180° to the extent of said table top contacting the fixed stop, whereupon the clamping means may be released permitting the cover to rotate from its first position to its second position to allow the media with the wet DNA coated spots to be removed from the table top and said spots to dry to thereby form said dry DNA transfer media.

17. The apparatus as claimed in claim 16, further comprising a resilient foam sheet interposed between the bottom surface of the hinged cover and said transfer media and being of a thickness such that with the clamping means fixing the cover in spaced overlying position with said table top, said resilient foam sheet compresses the transfer media against the upper surface of the at least one well plate to seal said transfer media against the well plate surface.

18. The apparatus as claimed in claim 16, wherein said at least one well plate comprises a plurality of well plates, and wherein said table top includes a like number of grooves within which respective well plates are positioned for positively locating said well plates on the upper surface of said table top.

19. The apparatus as claimed in claim 16, wherein a vacuum groove is provided within the bottom surface of said hinged cover underlying said transfer media, and wherein said vacuum groove is connected to a source of vacuum via a vacuum line to fix the transfer media in position as determined by said location means.

20. The apparatus as claimed in claim 16, wherein said location means comprises location pins projecting outwardly of the bottom surface of said hinged cover, and said transfer media includes holes sized to said pins and positioned to receive the pins.

21. Apparatus for forming a dry DNA transfer media capable of physical and chemical dry transfer of DNA to a test substrate, said apparatus comprising:
a table, said table including a flat horizontal base, location means for locating a transfer media at a fixed position on an upper surface of said table top, riser means adjacent one end of said transfer media, a flat rectangular well plate holder pivoted at one end to an upper end of said riser means for pivoting of said well plate holder through an arc of at least 90° between a position overlying said transfer media and extending parallel thereto and a raised position, a locking pin and support means at an end of said well plate holder remote from said hinge and including a stop for supporting said well plate holder in a fixed position overlying said transfer media and parallel thereto, at least one elongated well plate hole within said well plate holder for receiving a well plate, said well plate including a plurality of spaced upwardly open cup-shaped wells for receiving separated, replicated DNA genes solubilized in a solution within respective wells, and means carried within said well for sealing off the upper open ends of said wells and for facilitating locally wet coating of the facing surface of said transfer media when said at least one well plate is inverted and inserted within a correspondingly sized opening within said well plate holder to the extent of said means closing off the open ends of said wells contacting the surface of said transfer media, whereupon release of said clamping means and rotating of said pivotable well plate holder to said raised position moves the well plates away from the wet DNA coated surface of said transfer media to permit removal of said transfer media from the upper surface of said table and to allow replacement thereof by a new uncoated transfer media and the process repeated.

22. The apparatus as claimed in claim 21, wherein said means mounted within said wells comprise:
dispensing valves, said dispensing valves each comprising a cylindrical upwardly open valve body having an axial bore and a counterbore, said axial bore extending through a bottom face of said valve body, said counterbore opening outwardly of a top face of said body, a movable valve plunger mounted coaxially within said bore and counterbore, a triangularly shaped stem guide and fill opening plate mounted within said counterbore adjacent said top face and including an axial bore receiving one end of said stem, said stem forming a part of said plunger and including a radially enlarged tapered valve stopper seated on an end of said axial bore for closing off said axial bore, biasing means biasing said plunger in valve closed position, said plunger terminating in a reduced diameter tip projecting axially below said bottom face, and wherein said dispenser valves are inverted and sealably positioned within the open end of said wells within said well plate, such that when the well plate is inverted after positioning of the dispenser valves within respective wells and with DNA solution within the wells, the tapered valve stoppers prevent release of DNA solution until the projecting tips of said movable valve plungers contact the facing surface of said transfer media to open said valve plungers against said biasing means to effect local wetting of the transfer media at positions corresponding to the positions of the spaced wells within the well plate.

23. The apparatus as claimed in claim 21, wherein the means closing off the openings within the space wells of the well plate comprise applicator wicks, the wicks being sized slightly larger than the internal diameter of the wells and being fitted thereto and having one end projecting outwardly from the upper surface of the well plate and having another opposite end projecting downwardly within the well for contact with the DNA solution therein, and said one end being wetted by capillary action upon wick contact with the DNA solution such that a liquid DNA film forms on said one end of the applicator wick projecting outwardly from the upper surface of the well plate such that upon inversion of the well plate the DNA solution film on the projecting end of the applicator wick is contactable with the facing surface of the transfer media to create said wet spots of DNA solution during depression of the well plate within the well plate opening of the well plate holder.

24. The apparatus as claimed in claim 21, wherein a vacuum groove is formed within the upper face of the table top beneath the transfer media, and a vacuum line couples the vacuum groove to a source of vacuum so as to vacuum fix the transfer media in a position determined by the location means.

25. A dry DNA transfer media comprising one member of the group consisting of a flexible film, paper, nitrocellulose, plastic, glass for overlying a top surface of a generally rigid well plate carrying separated, replicated DNA genes solubilized in a solution within respective spaced upwardly open cells within said well plate, said media including DNA solution barriers at spaced locations within said media at locations corresponding to said wells to permit DNA solution local wet coating upon sealing of the transfer media to the surface of the well plate bearing said upwardly open well, but preventing the DNA gene solution from running radially from one spot to another as defined by the barrier means.

26. The dry DNA transfer media as claimed in claim 25, wherein said media is paper, and wherein said barriers comprises mechanical indentions sized to and configured to said wells at respective well locations.

27. The dry DNA transfer media as claimed in claim 25, wherein said media comprises a composite structure including a non-porous sheet bearing spaced cutouts corresponding to said well openings at respective locations corresponding to said wells and carrying coplanar porous inserts within respective cutouts.

28. The dry DNA transfer media as claimed in claim 27, wherein said inserts are formed of porous paper.

\* \* \* \* \*